United States Patent [19]

Nelson et al.

[11] Patent Number: 5,300,546
[45] Date of Patent: Apr. 5, 1994

[54] STABILIZATION OF MINERAL FILLED POLYESTERS USING EPOXY COMPOUND

[75] Inventors: Linda H. Nelson; Eileen B. Walsh, both of Evansville, Ind.

[73] Assignee: General Electric Company, Pittsfield, Mass.

[21] Appl. No.: 952,219

[22] Filed: Sep. 28, 1992

Related U.S. Application Data

[63] Continuation of Ser. No. 732,222, Jul. 18, 1991, abandoned.

[51] Int. Cl.$^5$ ............................................. C08K 5/15
[52] U.S. Cl. ..................................... 524/114; 524/109; 524/292; 524/413; 524/423; 524/432; 524/425; 524/449
[58] Field of Search ............... 524/114, 109, 186, 292, 524/413, 423, 432, 425, 449; 523/511, 204

[56] References Cited

U.S. PATENT DOCUMENTS

| | | | |
|---|---|---|---|
| 3,547,873 | 12/1970 | Weissermel et al. | 525/438 |
| 3,886,104 | 5/1975 | Borman et al. | 525/114 |
| 4,020,122 | 4/1977 | Borman et al. | 525/438 |
| 4,071,504 | 1/1978 | Korver | 260/75 |
| 4,130,541 | 12/1978 | Lazarus et al. | 260/45.8 |
| 4,141,882 | 2/1979 | Kodama et al. | 260/40 |
| 4,246,378 | 1/1981 | Kometani et al. | 525/438 |
| 4,533,679 | 8/1985 | Rawlings | 523/204 |
| 4,795,771 | 1/1989 | Yoshihara | 524/292 |
| 4,892,901 | 1/1990 | Liu | 524/303 |
| 4,904,746 | 2/1990 | Brown et al. | 525/438 |
| 4,933,429 | 6/1990 | McCracken et al. | 524/186 |

FOREIGN PATENT DOCUMENTS 2098231 11/1982 United Kingdom ............. C08G 63

*Primary Examiner*—Paul R. Michl
*Assistant Examiner*—LaVonda DeWitt

[57] ABSTRACT

A novel polyester composition is disclosed comprising a linear polyester resin, an epoxy compound, a mineral filler and a catalyst. The novel polyester compositions have excellent hydrolytic stability and possess ceramic like qualities.

40 Claims, No Drawings

STABILIZATION OF MINERAL FILLED POLYESTERS USING EPOXY COMPOUND

CROSS REFERENCE TO RELATED APPLICATIONS

This is a continuation of copending application(s), Ser. No. 07/732,222 filed on Jul. 18, 1991, now abandoned.

The present invention is related to United States patent application Ser. No. 07/732,188, filed Jul. 18, 1991, abandoned entitled Stabilization of Polyesters Using Epoxy Compounds in Combination with a Catalyst.

The present invention is also related to the following United States patent applications: Ser. No. 07/597,849, filed Oct. 15, 1990 U.S. Pat. No. 5,214,088; Ser. No. 07/597,712, filed Oct. 15, 1990abandoned; Ser. No. 07/595,710, filed Oct. 15, 1990 U.S. Pat. No. 5,098,464; Ser. No. 07/597,703, filed Oct. 15, 1990 abandoned; Ser. No. 07/424,888, filed Oct. 20, 1989 abandoned; and Ser. No. 07/424,543, filed Oct. 20, 1989 abandoned.

FIELD OF THE INVENTION

The present invention relates to polyester compositions. more particularly the present invention relates to polyester compositions having improved hydrolytic stability and melt viscosity stability. Most particularly, the present invention relates to mineral filled linear polyester resins stabilized with epoxy compounds.

BACKGROUND OF THE INVENTION

Linear polyesters, such as poly(ethylene terephthalate) or PET, and poly(butylene terephthalate) or PBT, are widely used in the preparation of articles by forming methods such as injection molding. Many of their properties, including chemical stability, solvent resistance and low permeability to gases, make them attractive candidates for such forming operations as blow molding, profile extrusion and thermoforming. One problem in such operations is the relatively low melt viscosities of the polyesters, as a result of which the formed articles do not adequately retain their shape immediately after forming and before they have cooled. Another problem is the lack of hydrolytic stability of the polyesters.

In recent years, various methods have been developed for increasing the melt viscosities and melt strengths of such polyesters, as well as enhancing the hydrolytic stability of the polyesters.

Kodama et al., U.S. Pat. No. 4,141,882, describe obtaining a polyester composition having high melt viscosity by blending a polyester comprising at least 80 mole percent of ethylene terephthalate units with (1) an epoxy compound of isocyanuric acid construction (A) and at least one organic compound (B) capable of reacting with the epoxy compound (A), or (2) a product of the melt reaction of epoxy compound (A) with the organic compound (B).

Blaschke et al., United Kingdom Patent No. 2,098,231 describe shaped bodies formed of polytetramethylene terephthalate stabilized with triglycidyl isocyanurate (TGIC) or a bisoxazoline.

Yosihara, U.S. Pat. No. 4,795,771, describes polyesters exhibiting crystallization at low temperatures and having high heat distortion temperatures and good dimensional stability. The disclosed polyester compositions consist of polyester, of which 80% is poly(ethylene terephthalate), a carboxylic acid ester of a polyalkylene glycol, an epoxy compound having a polyoxyalkylene and an inorganic filler such as talc. Rawlings, U.S. Pat. No. 4,533,679, describes reinforced polyesters consisting of a polyester resin, a polyepoxy having more than two epoxide functionalities and a reinforcing agent.

Borman et al., U.S. Pat. No. 4,020,122, describe a method to increase the melt elasticity or viscosity of linear high molecular weight polyesters. The patentees teach adding to the polyester organic polyepoxides having at least two epoxide groups per molecule.

Korver, U.S. Pat. No. 4,071,504, disclose low carboxyl content polyester fibers. The fibers are produced by melt extruding a polyester and a catalytic material, such as an alkali metal salt, and adding and reacting therewith monofunctional epoxides.

Brown et al., U.S. Pat. No. 4,904,746, teach producing branched polyesters having advantageous melt viscosity properties. The improved method comprises forming a reactive concentrate by reacting (A) triglycidyl isocyanurate with (B) a linear polymer having ester and free carboxylic groups. The reactive concentrate is then melt blended with (C) a linear polyester with free carboxylic groups.

McCracken et al., U.S. Pat. No. 4,933,429, teach the production of high melt viscosity branched polyesters. The disclosed branched polyesters are produced by effecting a reaction between (A) a polyester having a substantial portion of free carboxylic groups, (B) a polyepoxy compound, preferably having at least three epoxy functionalities, and (C) a catalyst selected from salts of aliphatic carboxylic acids and primary alkylamines.

Kometani et al., U.S. Pat. No. 4,246,378, further describe a polyester having improved melt stability. The patentees teach preparing a composition having 100 parts by weight of polyester, 0.1–40 parts by weight of an epoxy compound, and 0.001–10 parts by weight of organic sulfonate salts and organic sulfate salts.

Borman et al., U.S. Pat. No. 3,886,104, teaches stabilizing high molecular weight polyester resins by adding to the polyester resin a stabilizer comprising an internally polyfunctional epoxide having at least two epoxide functionalities. The epoxide containing stabilizers disclosed to be useful are epoxidized polyunsaturated triglycerides.

Commonly assigned United States patent application Ser. No. 07/526,579, filed May 17, 1990 abandoned discloses branched polyesters having enhanced melt viscosity. The application describes adding a reinforcing mineral to a polyester resin branched with a TGIC branching agent.

However, the above-described polyester compositions do not teach a high density thermoplastic which possesses a ceramic like feel or the use of non-reinforcing fillers.

Surprisingly, it has now been found that compositions comprising linear polyesters, one or more epoxide compounds and mineral fillers provides a composition which possesses both excellent hydrolytic stability and ceramic like feel.

SUMMARY OF THE INVENTION

According to the present invention there is provided a thermoplastic resin composition comprising (a) a polyester resin; (b) a mono- or polyepoxy compound; and (c) a mineral filler. Preferably the compositions of the present invention further comprises (d) a catalyst compound and/or (e) a hindered phenol antioxidant.

Preferably the polyester component (a) is selected from the group consisting of poly(1,4-butylene terephthalate), poly(ethylene terephthalate), poly(1,4-cyclohexanedimethanol terephthalate) and blends of any of the foregoing, and is present in an amount ranging from about 15 to about 80 weight percent based on the weight of the total composition.

The preferred epoxy compound (b) is 3,4-epoxycyclohexylmethyl-3,4-epoxycyclohexylcarboxylate or a compound containing a single epoxide group. The preferred mineral filler (c) is barium sulfate. The preferred catalyst compounds (d) are salts of an aliphatic carboxylic acid.

Also according to the present invention there are provided articles made from the polyester compositions of the present invention.

DETAILED DESCRIPTION OF THE PRESENT INVENTION

Component (a) of the present invention comprises linear polyester resins. Polyesters generally for use herein are derived from an aliphatic or cycloaliphatic diol, or mixtures thereof, containing from 2 to about 10 carbon atoms and at least one aromatic dicarboxylic acid. Preferred polyesters are derived from an aliphatic diol and a aromatic dicarboxylic acid and have repeating units of the following general formula:

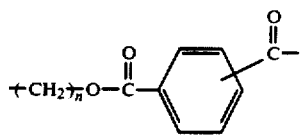

wherein n is an integer of from 2 to 6. The most preferred polyesters are poly(ethylene terephthalate), poly(1,4-butylene terephthalate) and mixtures thereof.

Also contemplated herein are the above polyesters with minor amounts, e.g., from 0.5 to about 5 percent by weight, of units derived from aliphatic acids and/or aliphatic polyols to form copolyesters. The aliphatic polyols include glycols, such as poly(ethylene glycol). All such polyesters can be made following the teachings of, for example, U.S. Pat. Nos. 2,465,319 and 3,047,539.

The polyesters which are derived from a cycloaliphatic diol and an aromatic dicarboxylic acid are prepared, for example, by condensing either the cis- or trans- isomer (or mixtures thereof) of, for example, 1,4-cyclohexanedimethanol with and aromatic dicarboxylic acid so as to produce a polyester having recurring units of the following formula:

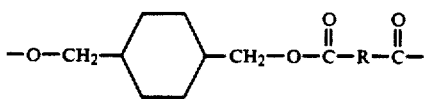

wherein the cyclohexane ring is selected form the cis- and trans- isomers thereof and R represents an aryl radical containing 6 to 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di-(p-carboxyphenyl)ethane, 4,4'-dicarboxydiphenyl ether, etc., and mixtures of these.

All of these acids contain at least one aromatic nucleus. Acids containing fused rings can also be present, such as in 1,4- or 1,5-naphthalenedicarboxylic acids. The preferred dicarboxylic acids are terephthalic acid or a mixture of terephthalic and isophthalic acids.

Another preferred polyester may be derived from the reaction of either the cis- or trans- isomer (or a mixture thereof) of 1,4-cyclohexanedimethanol with a mixture of isophthalic and terephthalic acids. Such a polyester would have repeating units of the formula:

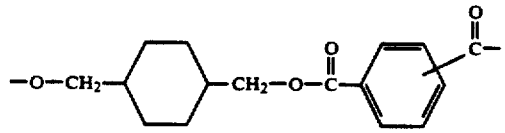

Still another preferred polyester is a copolyester derived from a cyclohexanedimethanol, an alkylene glycol and an aromatic dicarboxylic acid. These copolyesters are prepared by condensing either the cis- or trans-isomer (or mixture thereof) of, for example, 1,4-cyclohexanedimethanol and an alkylene glycol with an aromatic dicarboxylic acid so as to produce a copolyester having units of the formulae:

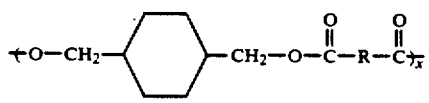

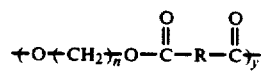

wherein the cyclohexane ring is selected from the cis- and trans- isomers thereof, R is as previously defined, n is an integer of to 6, the x units comprise from about 10 to about 90 percent by weight and the y units comprise from about 90 to about 10 percent by weight.

Such a preferred copolyester may be derived from the reaction of either the cis- or trans- isomer (or mixtures thereof) of 1,4-cyclohexanedimethanol and ethylene glycol with terephthalic acid in a molar ration of 1:2:3. These copolyesters have repeating units of the following formulae:

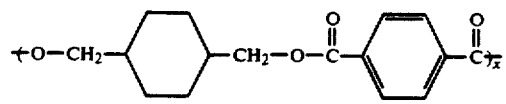

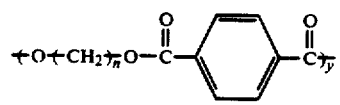

wherein x and y are as previously defined.

Also contemplated are polymers in which at least a portion of the monomers comprise soft segment radicals such as poly(oxyethylene) or poly(oxybutylene). Such polymers may be prepared by incorporating compounds such as polyethylene glycol, caprolactone or dicarboxylic acids containing polyoxyalkylene segments in the polymerization reaction, and are typically elastomeric. Illustrative polyesters of this type are available from DuPont and General Electric under the trade names HYTREL and LOMOD, respectively.

The polyesters described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g as measured in a 60:40 phenol/tetrachloroethane mixture or similar solvent at 23°-30° C.

The polyester resin component can vary widely in amount. Preferably the polyester resin component is present in an amount ranging from about 15 to about 80 weight percent based on the total weight of the composition. More preferably the polyester resin component is present in an amount ranging from about 30 to about 70 weight percent based on the total weight of the composition. Where a blend of poly(ethylene terephthalate) and poly(1,4-butylene terephthalate) is employed, the polyester resin component will comprise from about 1 to about 99 parts by weight poly(ethylene terephthalate) and from about 99 to about 1 part by weight poly(1,4-butylene terephthalate) based on 100 parts by weight of the poly(ethylene terephthalate) and poly(1,4-butylene terephthalate) combined. However, other polyester blends are also contemplated within the scope of the present invention.

Component (b) is at least one epoxy compound. The epoxy compound can include mono-, di- or tri- and poly- functional epoxide compounds. Most preferred and mono- and di - functional epoxide compounds. Preferably the compound will contain only carbon, hydrogen and oxygen. The compound will preferably have a molecular weight of below about 1000, to facilitate blending with the polyester resin. Many types of epoxy compounds are known in the art and any of them are capable of use in the present invention. They include bisphenol diglycidyl ethers, epoxy novolaks, glycidyl adducts of amines and amides, glycidyl adducts of carboxylic acids, polymers of unsaturated epoxides and compounds prepared by epoxidation of dienes or polyenes. The preferred polyepoxy compounds are poly(O- or N-epoxyalkyl-substituted) cyclic amides, imides and imidates, usually containing one non-epoxy cyclic moiety although compounds with linked or fused moieties are also contemplated.

Most often, the epoxide compound (b) is a compound in which the epoxyalkyl groups are bonded directly to the oxygen or nitrogen atoms; however, compounds containing intervening structure, such as 2-carboglycidyloxyethyl compounds may also be used. The presence of at least one epoxy group per molecule is essential.

Illustrative cyclic nuclei which may be present in component (b) are the triazine, barbiturate, hydantoin, uracil, pyromellitic diimide, piperazinedione and parabanate ring system. As previously noted, the epoxy-containing functionalities may be present as substituents on oxygen or nitrogen atoms therein, with nitrogen atoms frequently being preferred. The most suitable compounds are triazine derivatives, including triglycidyl cyanurate and ,triglycidyl isocyanurate (TGIC). TGIC is particularly preferred by reason of its commercial availability. It has the formula

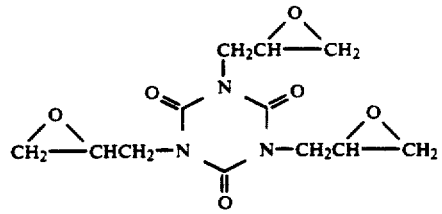

Preferred difunctional epoxy compounds will have at least one of the epoxide groups on a cyclohexane ring. Examples of preferred difunctional epoxy compounds are 3,4-epoxycyclohexyl-3,4-epoxycyclohexylcarboxylate, bis(3,4-epoxycyclohexylmethyl)adipate, vinylcyclohexene di-epoxide, bisphenol diglycidyl ethers, diglycidyl adducts of amines and amides, diglycidyl adducts of carboxylic acids and the like. Especially preferred is 3,4-epoxycyclohexyl-3,4-epoxycyclohexylcarboxylate.

The difunctional epoxide compounds can be made by techniques well known to those skilled in the art. For example, the corresponding $\alpha,\beta$-dihydroxy compounds can be dehydrated to produce the epoxide groups, or the correspondingly unsaturated compounds can be epoxidized by treatment with a peracid, such as peracetic acid, in well-known techniques. The compounds are also commercially available.

The epoxy compound (b) may be employed in any effective amount, but preferably small amounts are use, e.g., at a range of about 0.1 to about 5 percent by weight. However, a particularly preferred range is from about 0.1 to about 3.5 percent by weight. A more preferred range is from about 0.5 to about 2 percent by weight. Within this particularly preferred range it has been found advantageous to employ in certain compositions from about 1 to about 1.5 percent by weight of the difunctional polyepoxy compound. All percentages are based on the combined weights of polyester component and the organic epoxide component.

The mineral fillers (c) useful in the present invention can be selected from a wide variety of commercially available fillers and may include, e.g., barium sulfate, zinc oxide, calcium carbonate, mica, talc and mixtures thereof. Barium sulfate is especially preferred.

The mineral filler can be added in any amount. Preferably the mineral filler comprises from about 20 to about 85 parts by weight of the total composition, and more preferably, from about 30 to about 75 parts by weight.

Component (d) of the present invention consists of the catalyst compound. Preferred catalysts are salts free from direct carbon-phosphorous bonds and containing at least one of alkali metal cations and alkaline earth metal cations and halide anions. It is apparent that this class contains a large number of compounds. They include alkali metal halides, alkali metal carboxylates, alkali metal enolates, amine hydrohalides, alkali metal carbonates and quaternary ammonium halides. Illustrative compounds within this class are lithium fluoride, lithium iodide, potassium bromide, potassium iodide, sodium dihydrogen phosphate, sodium acetate, sodium benzoate, sodium caproate, sodium stearate, sodium ascorbate and dodecyltrimethylammonium bromide.

Salts of aliphatic carboxylic acids containing at least about 18 carbon atoms, especially the alkali metal stearates and preferably sodium stearate, have certain advantages over the other catalysts employed according to the invention and are therefore often preferred. In the first place, their use permits extrusion of the polyester-difunctional epoxide composition at substantially higher feed rates than those which are effective in their absence. In the second place, they impart substantially less odor to the composition than certain other compounds useful as catalysts, especially amines.

The catalyst component can be present in the composition of the present invention in any effective amount. Preferably the catalyst is present in an amount ranging from about 0.01 to about 1 weight percent, more preferably from about 0.03 to about 0.1 weight percent based on the total weight of the resin composition.

Optionally, the present invention further comprises component (e) a hindered phenol thermal antioxidant. Any hindered phenol known to those skilled in the art may be employed herein, a wide variety of these are commercially available.

Hindered phenols will generally be of the type in which there is a sterically hindered phenolic group, especially one containing a t-butyl group in the ortho position to the phenolic OH group. Examples of such compounds are many. Preferred examples are, tetrakis (methylene-3-(-3',5'-di-tert-butyl-4'-hydroxyphenyl)-propionate)methane; octadecyl-3-(3',5'-di-tert-butyl-4'-hydroxyphenyl)propionate; 1,3,5-trimethyl-2,4,6-tris(3,5-di-tert-butyl-4-hydroxybenzyl)benzene; 4,4'-(2,2-diphenylpropyl)-diphenylamine; esters of ethoxylated aryl phenols; 2,2'-thiodiethylbis(3-(3,5-di-tert-butyl-4-hydroxyphenyl))propionate; octadecyl-3,5-di-tert-butyl-4-hydroxyhydrocinnamate and mixtures of any of the foregoing. Most preferred is octadecyl-3,5-di-tert-butyl-4-hydroxyhydrocinnamate, which is commercially available as "IRGANOX" 1076, and tetrakis (methylene-3-(-3',5'-di-tert-butyl-4'-hydroxyphenyl)-propionate)methane which is commercially available as "IRGANOX" 1010.

The compositions of the present invention can also comprise any number of conventional additives, such as dyes, pigments, stabilizers, plasticizers, reinforcers, flame retardants, drip retardants, nucleants, rubbery impact modifiers and the like. These are added, as desired, for their conventionally employed purposes. Illustrative flame retardant additives are disclosed in U.S. Pat. Nos. 3,833,685; 3,342,254; 3,915,926 and 3,671,487. Other flame retardants are disclosed in U.S. Pat. Nos. 3,681,281; 3,557,053; 3,830,771 and United Kingdom Patent No. 1,358,080.

Generally speaking, the more important of the flame retardant compounds contain chemical elements employed for their ability to impart flame resistance, e.g., bromine, chlorine, antimony, phosphorous and nitrogen. It is preferred that the flame-retardant additive comprise a halogenated organic compound (brominated or chlorinated); a halogenated-containing organic compound in admixture with a phosphorous compound or compounds containing phosphorous-nitrogen bonds or a mixture of two or more of the foregoing.

The amount of flame retardant additive used is not critical to the present invention, so long as it is present in minor proportion based on said composition, major proportions will detract from physical properties, but at least sufficient to render the polyester resin non-burning o self-extinguishing. Those skilled in the art are well aware that the amount will vary with the nature of the resin and with the efficiency of the additive. In general, however, the amount of the additive will be from 0.5 to 50 parts by weight per 100 parts of resin.

A preferred range will be from about 3 to about 25 parts and an especially preferred range will be from about 8 to about 12 parts of flame retardant additive per 100 parts of resin. Smaller amounts of compounds highly concentrated in the elements responsible for flame-retardance will be sufficient, e.g., elemental red phosphorous will be preferred at 0.5 to 2.0 parts by weight per hundred parts of resin, while phosphorous in the form of triphenyl phosphate will be used a 25 parts of phosphate per 100 parts of resin, and so forth. Halogenated aromatics will be used at 8 to 12 parts and synergists, e.g., antimony oxide, will be used at about 2 to about 5 parts by weight per 100 parts by weight of resin.

The compositions of the present invention may also comprise a drip retardant agent. These are described in U.S. Pat. No. 3,671,487. Generally, the drip retardant agent comprises a polytetrafluoroethylene resin, which is commercially available or can be prepared by known processes. They are white solids obtained by polymerization of the tetrafluoroethylene in aqueous media with free radical catalysts, e.g., sodium, potassium or ammonium peroxydisulfates at 100 to 1,000 psi and at 0°–200° C. and preferably 20°–100° C. See, Brubaker, U.S. Pat. No. 2,393,967.

The most preferred reinforcing agent comprises glass fillers. Preferably the glass fillers are in the form of filamentous glass fibers or glass flakes. These are well known to those skilled in the art and are widely available from a number of manufacturers. For compositions ultimately employed for electrical uses, it is preferred to use fibrous glass filaments comprised of lime-aluminum borosilicate glass that is relatively sodium free. This is known as "E" glass. However, other glass compositions are useful. Especially preferred are K filament glass (about 14 micron diameter), G filament glass (about 10 micron diameter) and D filament glass (about 7 micron diameter). All such glasses are contemplated as within the scope of the present invention. The filaments are made by standard processes, e.g., by steam or air blowing, flame blowing and mechanical pulling. The preferred filaments for plastics reinforcement are made by mechanical pulling. The filament diameters preferably range from about 0.00012 to about 0.00075 inch, but this is not critical to the present invention. It is known, however, to those skilled in the art, that smaller filament diameters will also increase the strength of plastics treated therewith.

The length of the glass filaments and whether or not they are bundled into fibers and the fibers bundled in turn to yarns, ropes or rovings, or woven into mats, and the like are also not critical to the invention. However, in preparing the molding compositions of the present invention, it is convenient to use filamentous glass in the form of chopped strands of from about one-eighth to about 2 inches long. In articles molded from the compositions, on the other hand, even shorter lengths will be encountered because, during compounding, considerable fragmentation will occur.

The process of this invention can be carried out by a number of procedures. In one way, the epoxide compound is put into an extrusion compounder with the dry polyester, mineral filler and catalyst compound, and the blend is heated at an elevated temperature, e.g., 450°–550° F., and extruded to produce molding pellets. The epoxide compound is dispersed in the polyester resin, mineral filler and catalyst, and the melt viscosity is elevated in the process. In another procedure, the epoxide compound is mixed with the polyester resin, mineral filler and catalyst blending at ordinary temperatures, then the blend is fluxed on a mill, heated, e.g. at 450°-550° F., cooled and chopped. The epoxide compound can also be mixed with the powdered or granular polyester, mineral filler and the catalyst, and the mixture can be heated and directly formed into molded items using machines which compound and mold. In still another procedure, the epoxy compound may be incorporated in the final stage of the polyester resin manufacture process.

In preferred embodiments of the present invention, the mineral filler is not added to the composition until after the polyester, epoxide compound and catalyst have been compounded. This can effectively be carried out by compounding the polyester, epoxide compound and catalyst in a first extruder, and then further compounding the extrudate with the mineral filler in a second extruder. Alternatively, the compounding may be carried out in a single extruder by adding the polyester, epoxide compound and catalyst in an upstream feedport of the extruder, and then adding the mineral filler to a downstream feedport of the extruder.

Compounding should be carried out to ensure that the temperature is carefully controlled; and is preferably maintained below about 530° F. Preferably the compounding is continued until an intimate blend between the resin, mineral filler, the catalyst and epoxide compound is obtained.

The other above-mentioned additives can be added during compounding to impart on the blend the desired characteristics, as known to those skilled in the art.

The compositions of the present invention may then be formed into various articles. Preferably the compounded resin is injected molded into an article or is extruded into a sheet and then thermoformed into a variety of articles. The compositions are also suitable for profile extrusion, molding and other processes known to those skilled in the art that require higher melt strength than normal systems. See, e.g. *Modern Plastics Encyclopedia '89*, McGraw Hill, Vol. 65, No. 11, pp. 215-308.

DESCRIPTION OF THE PREFERRED EMBODIMENTS

The following specific examples illustrate the present invention. However, they are not to be construed to limit the claims in any manner whatsoever.

EXAMPLE 1

Polyester compositions are prepared by tumble blending the respective ingredients and compounding in a 2.5 inch single screw HPM volatilizing extruder. The extruder parameters were : 510°-520° F. barrel set temperature, 80-110 rpm screw speed. After drying at 250° F. for four hours, the blends were injected molded into test specimens using a 490°-510° F. barrel set temperature, 150°-180° F. mold temperature, 12 second injection time, 13 second hold time, and >100 psi back pressure.

Melt viscosities of the blends were measured on a Tinius Olsen viscometer. The resin blends were extruded with a 8-10 g load through a 0.0825 inch orifice at 266° C.

For comparative purposes, samples were prepared without addition of a catalyst and epoxide compound.

The results along with the resin blend compositions are reported below in Table 1.

TABLE 1

| Example | A* | 1 |
|---|---|---|
| Composition, wt % | | |
| Polyester[a] | 36.7 | 35.65 |
| Mineral Filler[b] | 63.0 | 63.0 |
| Epoxide[c] | — | 1.0 |
| Catalyst[d] | — | 0.05 |
| PE - 18[e] | 0.2 | 0.2 |
| Irganox 1010 | 0.1 | 0.1 |
| Properties | | |
| Melt viscosity, poise | | |
| Initial | 5320 | 6870 |
| Final | 220 | 752 |
| Percent Retention | 4.1 | 10.9 |

*Comparative example
[a] Poly(1,4-butylene terephthalate), "VALOX" 295, General Electric Company
[b] Barium sulfate, Huberbrite 7
[c] 3,4-epoxycyclohexylmethyl-3,4-epoxycyclohexylcarboxylate, "BAKELITE" ERL 4221, Union Carbide Company
[d] Sodium stearate
[e] Pentaerythritol tetrastearate, Henkel
[f] at 266° F., 4400 g
[g] after 17 hours in pressure cooker at 120° F., 100% relative humidity As is clearly demonstrated by Table 1 above, the mineral filled polyester composition streated with the epoxide compound exhibit significantly improved melt viscosity properties after aging over the mineral filled polyester resin without the epoxide compound treatment.

EXAMPLE 2-5

The procedure of Example 1 is followed except the blends compositions are varied. The results, along with compositional data are set forth below in Table 2.

TABLE 2

| Example | B* | 2 | 3 | 4 | 5 |
|---|---|---|---|---|---|
| Composition, wt. % | | | | | |
| PBT[a] | 23.9 | 23.9 | 23.9 | 23.9 | 23.9 |
| PET[b] | 11.7 | 11.7 | 11.6 | 11.6 | 11.6 |
| ERL 4221[c] | 1.0 | — | 1.0 | — | 1.0 |
| ECN 1299[d] | — | 1.0 | — | 1.0 | — |
| BaSO$_4$ | 63.0 | 63.0 | 63.0 | 63.0 | 63.0 |
| Catalyst[e] | — | — | 0.1 | 0.1 | — |
| Stabilizer[f] | 0.4 | 0.4 | 0.4 | 0.4 | 0.4 |
| Bu(ph)$_3$P$^+$Br$^{-g}$ | — | — | — | — | 0.1 |
| Properties | | | | | |
| Flex Modulus, kpsi | | | | | |
| Initial | 8323 | 9123 | 9297 | 9795 | 9780 |
| Final | 3980 | 6370 | 4060 | 7220 | 4720 |
| Percent Retention | 48 | 70 | 44 | 74 | 48 |
| Flex Strength, psi | | | | | |
| Initial | 8323 | 8890 | 7020 | 7980 | 7900 |
| Final | 8470 | 8800 | 7500 | 10390 | 8400 |
| Percent Retention | 58 | 56 | 59 | 66 | 59 |
| Tensile Strength, psi | | | | | |
| Initial | 8239 | 8954 | 7085 | 7969 | 7957 |
| Final | 3625 | 3940 | 3330 | 5100 | 3660 |
| Percent Retention | 44 | 44 | 47 | 64 | 46 |

*Comparative Example
[a] Poly(1,4-butylene terephthalate), "VALOX" 295, General Electric Company
[b] Polyethyleneterephthalate, ICI X5202
[c] 3,4-epoxycyclohexylmethyl-3,4-epoxycyclohexylcarboxylate, "BAKELITE" ERL 4221, Union Carbide Company
[d] Epoxy cresol novolac resin, Ciba Geigy
[e] Sodium stearate
[f] "IRGANOX" 1010, hindered phenol antioxidant, Ciba Geigy Company
[g] (Butyl)triphenylphosphoniumbromide, Aldrich As can clearly be seen from Table 2 above, the polyester composition melt blended with the epoxy compound, catalyst and mineral filler exhibited significantly better retention of flex modulus, flex strength and tensile strength after aging than did the polyester without the epoxide compound.

EXAMPLES 6-7

The procedure of Example 1 is followed except the blends are prepared in a pre-extrusion method. First the polyester, epoxide and catalyst are pre-extruded in a 6 inch single screw extruder at a 500° F. barrel set temperature, 84 rpm screw speed. The extrudate is then further compounded with barium sulfate in an extruder operating at the same parameters as in Example 1. The results, along with the compositional data re set forth below in Table 3.

TABLE 3

| Examples | C* | 6 | 7 |
|---|---|---|---|
| Composition, wt. % | | | |
| Polyester | 37 | 35.94 | 34.94 |
| BaSO$_4$$^b$ | 63.00 | 63.00 | 63.00 |
| ERL 4221$^c$ | — | 1.0 | 2.0 |
| Na Stearate | — | 0.06 | 0.06 |
| Properties | | | |
| Melt Viscosity, poise$^d$ | | | |
| Initial | 14680 | 21200 | 19260 |
| Final | 4760 | 12040 | 16040 |
| Percent Retention | 32 | 57 | 83 |

$^a$Poly(1,4-butylene terephthalate), "VALOX" 315, General Electric Company
$^b$Huberbrite 7
$^c$3,4-epoxycyclohexylmethyl-3,4-epoxycyclohexylcarboxylate, "BAKELITE", Union Carbide Company
$^d$at 266° C.

Table 3 above demonstrates that the significant improvement in hydrolytic stability of compositions of the present invention over polyesters alone.

The above-mentioned patents and patent applications are all hereby incorporated by reference.

Many variations of the present invention will suggest themselves to those skilled in this art in light of the above detailed description. For example, instead of poly(1,4-butylene terephthalate), other polyester resins such as a poly(ethylene terephthalate), a poly(1,4-cyclohexanedimethanol terephthalate) or mixtures thereof may be employed. Additionally, a number of other epoxide compounds may be effectively employed, such as vinylcyclohexene di-epoxide, bis(3,4-epoxycyclohexylmethyl)adipate, triglycidyl isocyanurate, N-methyl-N'isocyanurate, N''-diglycidyl isocyanurate and triglycidyl cyanurate, or mixtures thereof. Also contemplated for use herein as a catalyst compound are potassium bromide, lithium iodide, lithium fluoride, sodium acetate, potassium iodide, sodium caproate, sodium benzoate, sodium ascorbate, sodium dihydrogen phosphate, and mixtures thereof. Other mineral fillers known to those skilled in the art may also be employed, including but not limited to, mica, asbestos, wollastonite, clay talc, carbon, ceramic, titanate and mixtures thereof. It is further contemplated to add to the polyester compositions any of the known hindered phenols, as well as a wide variety of conventional additives including, but not limited to, flame and drip retardants. It is further within the scope of the present invention to modify the compositions of the present invention with reinforcing agents, especially glass fibers and glass flakes. All such obvious modifications are within the full intended scope of the appended claims.

We claim:

1. A thermoplastic polyester/epoxide composition having improved hydrolytic and melt viscosity stability and comprising:

(a) from about 15 to about 80 percent by weight of a polyester resin;
   (b) from about 0.1 to about 3.5 percent by weight based on the total weight of the composition of an epoxy compound selected from the group consisting of bis(3,4-epoxycyclohexylmethyl)adipate; vinylcyclohexene diepoxide; 3,4-epoxycyclohexyl-3,4-epoxycyclohexylcarboxylate; bisphenol diglycidyl ethers; diglycidyl adducts of carboxylic acids; triglycidyl isocyanurate and mixtures of any of the foregoing;
   (c) from about 20 to about 85 parts by weight of a mineral filler selected from the group consisting of barium sulfate, zinc oxide, calcium carbonate, mica, talc, asbestos, wollastonite, clay, carbon, ceramic, titanate and mixtures of any of the foregoing; and
   (d) from about 0.1 to about 1 weight percent of a catalyst compound comprising a salt free from direct carbon-phosphorous bonds and containing at least one of alkali metal cations and alkaline earth metal cations and halide anions; wherein the composition is prepared by first compound the polyester, the epoxide compound, and the catalyst to form a compounded mixture, and then compounding the compounded mixture with the filler.

2. A composition as defined in claim 1 wherein said component (a) polyester resin comprises units of an aliphatic diol, a cycloaliphatic diol or a mixture of such diols and an aromatic diacid.

3. A composition as defined in claim 2 wherein said component (a) is selected from the group consisting of a poly(1,4-butylene terephthalate), poly(ethylene terephthalate), poly(1,4-cyclohexanedimethanol terephthalate) and blends thereof.

4. A composition as defined in claim 3 wherein said component (a) comprises poly(1,4-butylene terephthalate).

5. A composition as defined in claim 2 wherein said polyester further comprises soft segment units derived from poly(oxylalkylene).

6. A composition as defined in claim 1 wherein said component (a) polyester resin has an intrinsic viscosity of at least about 0.4 deciliters per gram when measured in a 60:40 mixture of phenol and trichloroethane at 25° C.

7. A composition as defined in claim 1 wherein said epoxy compound comprises 3,4-epoxycyclohexyl-3,4-epoxycyclohexylcarboxylate.

8. A composition as defined in claim 1 wherein said mineral filler comprises barium sulfate.

9. A composition as defined in claim 1 wherein said catalyst compound (d) is selected from the group consisting of potassium bromide, potassium iodide, lithium iodide, lithium fluoride, sodium acetate, sodium caproate, sodium benzoate, sodium stearate, sodium ascorbate, sodium dihydrogen phosphate, dodecyltrimethylammonium bromide and mixtures thereof.

10. A composition as defined in claim 9 wherein said catalyst component comprises sodium stearate.

11. A composition as defined in claim 1 wherein said composition further comprises:

(e) a hindered phenol antioxidant.

12. A composition as defined in claim 1 wherein said composition further comprises an additive selected from the group consisting of flame retardants, drip retardants, reinforcers, dyes, pigments, stabilizers, nucleants, rubbery impact modifiers and mixtures thereof.

13. A composition as defined in claim 1 wherein said polyester resin is present in an amount ranging from about 30 to about 70 weight percent based on the total weight of composition.

14. A composition as defined in claim 1 wherein said epoxy compound is present in an amount ranging from about 0.5 to about 2 weight percent based on the total weight of the composition, 15. A composition as defined in claim 14 wherein said epoxy compound is present in an amount ranging from about 1 to about 1.5 weight percent based on the total weight of the composition.

16. A composition as defined in claim 1 wherein said mineral filler is present in an amount ranging from about 30 to about 75 parts by weight based on the total weight of the composition.

17. A composition as defined in claim 1 wherein said catalyst compound is present in an amount ranging from about 0.03 to about 0.1 weight percent based on the total weight of the composition.

18. A method for improving the hydrolytic and melt viscosity stability and ceramic-like feel of a thermoplastic polyester/epoxide composition comprising the steps of (1) first compounding from about 15 to about 80 percent by weight of a thermoplastic linear polyester resin, from about 0.1 to about 3.5 percent by weight based on the total weight of the compounded composition of an epoxy compound selected from the group consisting of bis(3,4-epoxycyclohexylmethyl)adipate; vinylcyclohexene diepoxide; 3,4-epoxycyclohexyl-3,4-epoxycyclohexylcarboxylate; bisphenol diglycidyl ethers; diglycidyl adducts of carboxylic acids; triglycidyl isocyanurate and mixtures of any of the foregoing, and from about 0.1 to about 1 weight percent of a catalyst compound comprising a salt free from direct carbon-phosphorous bonds and containing at least one of alkali metal cations and alkaline earth metal cations and halide anions to form a compounded mixture, and then (2) compounding the compounded mixture with from about 20 to about 85 weight percent based on the total weight of the composition of a mineral filler selected from the group consisting of barium sulfate, zinc oxide, calcium carbonate, mica, talc, asbestos, wollastonite, clay, carbon, ceramic, titanate and mixtures of any of the foregoing.

19. A method as defined in claim 18 wherein said polyester resin comprises units of an aliphatic diol, a cycloaliphatic diol or a mixture of such diols and an aromatic diacid.

20. A method as defined in claim 19 wherein said polyester resin is selected from the group consisting of poly(1,4-butylene terephthalate), a poly(1,4-cyclohexanedimethanol terephthalate), a poly(ethylene terephthalate), and blends thereof.

21. A method as defined in claim 20 wherein said polyester resin comprises a poly(1,4-butylene terephthalate).

22. A method as defined in claim 19 wherein said polyester further comprises soft segment units derived from poly(oxyalkylene).

23. A method as defined in claim 18 wherein said polyester resin has an intrinsic viscosity of at least about 0.4 deciliters per gram when measured in a 60:40 mixture of phenol and trichloroethane at 25° C.

24. A method as defined in claim 18 wherein said epoxy compound comprises 3,4-epoxycyclohexylmethyl-3,4-epoxycyclohexylcarboxylate.

25. A method as defined in claim 18 wherein said mineral filler comprises barium sulfate.

26. A method as defined in claim 18 wherein said catalyst compound is selected from the group consisting of potassium bromide, potassium iodide, lithium iodide, lithium fluoride, sodium acetate, sodium caproate, a sodium benzoate, sodium stearate, sodium ascorbate, sodium dihydrogen phosphate, dodecyltrimethylammonium bromide and mixtures thereof.

27. A method as defined in claim 26 wherein said catalyst compound comprises sodium stearate.

28. A method as defined in claim 18 wherein said method further comprises compounding into the composition a hindered phenol antioxidant.

29. A method as defined in claim 18 wherein said method further comprises compounding into the composition an additive selected from the group consisting of flame retardants, drip retardants, dyes, pigments, stabilizers, plasticizers, nucleants, reinforces, rubbery impact modifiers and mixtures thereof.

30. A method as defined in claim 18 wherein said compounding comprises melt blending or milling.

31. A method as defined in claim 18 wherein said polyester is present in an amount of from about 30 to about 70 weight percent of the total weight of the compounded composition.

32. A method as defined in claim 18 wherein said epoxy compound is present in an amount ranging from about 0.5 to about 2 weight percent based on the total weight of the compounded composition.

33. A method as defined in claim 32 wherein said epoxy compound is present in an amount ranging from about 1 to about 1.5 weight percent based on the total weight of the compounded composition.

34. A method as defined in claim 18 wherein said mineral filler is present in an amount ranging from about 30 to about 75 weight percent based on the total weight of the composition.

35. A method as defined in claim 18 wherein said catalyst compound is present in an amount ranging from about 0.03 to about 0.1 weight percent based on the total weight of the compounded composition.

36. A method as defined in claim 25 wherein step (a) is carried out in a first extruder and step (b) is carried out in a second extruder.

37. A method as defined in claim 18 wherein step (a) is carried out in an upstream portion of an extruder and step (b) is carried out in a downstream portion of said extruder.

38. An article produced from the composition as defined in claim 1.

39. A thermoplastic polyester/epoxide composition having improved hydrolytic and melt viscosity stability and a consisting essentially of:
(a) from about 15 to about 80 parts by weight of a polyester resin;
(b) from about 0.1 to about 3.5 weight percent based on the total weight of the composition of an epoxy compound selected from the group consisting of bis(3,4-epoxycyclohexylmethyl)adipate; vinylcyclohexene di-epoxide; 3,4-epoxycyclohexyl-3,4-epoxycyclohexylcarboxylate; bisphenol diglycidyl ethers; diglycidyl adducts of adducts of carboxylic acids; triglycidyl isocyanurate and mixtures of any of the foregoing;
(c) from about 20 to about 85 parts by weight of a mineral filler selected from the group consisting of barium sulfate, zinc oxide, calcium carbonate, mica, talc, asbestos, wollastonite, clay, carbon, ceramic, titanate, and mixtures of any of the foregoing; and (d) from about 0.1 to about 1 weight percent of a catalyst compound comprising a salt free from direct carbon-phosphorous bonds and containing at least one of alkali metal cations and alkaline earth metal cations and halide anions; wherein the compositions is prepared by first compounding the polyester, the epoxide compound, and the catalyst to form a compounded mixture, and then compounding the compounded mixture with the filler.

40. A thermoplastic polyester/epoxide resin composition having improved hydrolytic and melt viscosity stability and a consisting essentially of:

(a) from about 30 to about 70 percent by weight of a polyester resin comprising poly(1,4-butylene terephthalate);

(b) from about 0.5 to about 2 weight percent based on the total wight of the composition of an epoxy compound comprising 3,4-epoxycyclohexyl-3,4-epoxycyclohexylcarboxylate;

(c) from about 30 to about 75 parts by weight of a mineral filler comprising selected barium sulfate; and (d) from about 0.03 to about 0.1 weight percent of a catalyst compound comprising sodium stearate; wherein the composition is prepared by first compounding the polyester, the epoxide compound, and the catalyst to form a compounded mixture, and then compounding the compounded mixture with the filler.

* * * * *